United States Patent
Ellery et al.

(10) Patent No.: US 7,921,887 B2
(45) Date of Patent: Apr. 12, 2011

(54) ROUTER GUIDE ASSEMBLY FOR CUTTING RETURN BENDS IN RADIANT FLOORING UNDERLAYMENT PANELS

(76) Inventors: Michael K. Ellery, W. Warwick, RI (US); Dale Buckey, Jamestown, RI (US)

( * ) Notice: Subject to any disclaimer, the term of this patent is extended or adjusted under 35 U.S.C. 154(b) by 150 days.

(21) Appl. No.: 12/031,816

(22) Filed: Feb. 15, 2008

(65) Prior Publication Data
US 2008/0196792 A1    Aug. 21, 2008

Related U.S. Application Data

(60) Provisional application No. 60/890,316, filed on Feb. 16, 2007.

(51) Int. Cl.
*B27C 5/00* (2006.01)
(52) U.S. Cl. ............. 144/136.1; 144/144.1; 144/144.52; 409/179
(58) Field of Classification Search ............... 144/136.1, 144/144.1, 144.51, 144.52, 145.1; 409/125, 409/130, 182, 178, 179
See application file for complete search history.

(56) References Cited

U.S. PATENT DOCUMENTS

| | | | | |
|---|---|---|---|---|
| 1,751,816 A * | 3/1930 | Hunter | ...................... | 144/144.51 |
| 3,716,085 A * | 2/1973 | Wing | .......................... | 144/144.1 |
| 4,306,598 A * | 12/1981 | Peot | .......................... | 144/136.95 |
| 4,911,214 A * | 3/1990 | Scott | .......................... | 144/154.5 |
| 4,921,023 A * | 5/1990 | Pempek | .................... | 144/136.95 |
| 5,414,938 A * | 5/1995 | Meek | ................................ | 33/452 |
| 5,682,934 A * | 11/1997 | Rybski | ...................... | 144/144.51 |
| 6,918,720 B2 * | 7/2005 | Kopras et al. | ................. | 409/182 |
| 2005/0274432 A1 * | 12/2005 | Gass et al. | .................. | 144/154.5 |
| 2006/0157155 A1 * | 7/2006 | Robinson | ................. | 144/136.95 |

* cited by examiner

*Primary Examiner* — Shelley Self
(74) *Attorney, Agent, or Firm* — Barlow, Josephs & Holmes, Ltd.

(57) ABSTRACT

A guide system for cutting return bends directly into the underlayment panels of a radiant floor heating system is provided that eliminates the need for the installation of separate return panels. The guide system includes a guide panel having a guide rail on its bottom surface and a pivoting guide on its top surface. The pivoting guide is pivotally movable through a 180-degree arc relative to the guide panel and is configured to receive a router with a plunge or dovetail bit installed therein. In this manner, the router is pivotably movable through a controlled 180-degree semi-circular arc from a point that is aligned with a groove in which the guide rail is installed to a groove in an adjacent underlayment panel allowing the user to pivot the router to cut a return bend into the underlayment in the desired location.

14 Claims, 7 Drawing Sheets

ROUTER GUIDE ASSEMBLY FOR CUTTING RETURN BENDS IN RADIANT FLOORING UNDERLAYMENT PANELS

CROSS-REFERENCE TO RELATED APPLICATIONS

This application is related to and claims priority from earlier filed U.S. Provisional Patent Application No. 60/890,316, filed Feb. 16, 2007.

BACKGROUND OF THE INVENTION

The present invention relates generally to radiant floor heating systems and the manner in which they are installed. More specifically, the present invention relates to a router guide system that is used for cutting the necessary tubing return bends into solid flooring underlayment panels such that the return bends are aligned with the grooves in traditional, pre-grooved radiant flooring underlayment panels.

As homebuilding technology has improved over the past several years, building contractors have sought out newer technologies that are both cost effective while also serving to make the occupant of the completed building more comfortable. In this context, radiant floor heating systems have become an extremely popular method for the delivery of heat in both commercial buildings and residential homes. Radiant floor heating systems are similar in operation to older forced hot water baseboard systems where warm water is pumped through an array of pipes to distribute heat. The main difference between the two systems is that the older base board systems distributed the warm water through an array of miniature radiant panels connected by rigid piping and arranged along the exterior walls of the building, while radiant floor heating systems pump warm water through flexible cross-linked polyethylene plastic pipe, known as PEX, which is installed directly under the finished floor.

When radiant heating systems were first introduced, the plastic warm water distribution pipes were commonly imbedded in concrete floors or stapled to the underside of the sub-floor sheathing (staple-up method). However, as the radiant floor systems became more popular, several radiant pipe manufacturers began to develop proprietary underlayment panels, such as those depicted in FIG. 1, which could be installed directly onto floor joists in new construction, or over existing concrete or plywood sub-flooring. Typically, these prior art underlayment panels 2 are made of ½ inch or ¾ inch CDX plywood and are attached to an aluminum backing that acts as a heat spreader to more evenly distribute the heat throughout the finished floor. The panels 2 come in various sizes, such as for example 7×48 inches and 10×48 inches. Regardless of size, each panel 2 has a groove 4 down the center of the plywood panel 2 to accept a single run of tubing 6, so when the panels 2 are installed side-by-side onto the floor, the tubing 6 runs end up being spaced apart at either 7 inches or 10 inches on-center, depending on the width of the panel 2. In addition, some panels 2 have narrow grooves 4 therein for use with smaller ¼ inch (I.D.) tubing, while others have grooves 4 that are suited to more typical ⅜ inch or ½ inch tubing. Once the panels 2 are installed, the tubing 6 is then installed into the grooves 4 and retained in place by frictional force.

While the above noted panels 2 work well in straight line tubing runs, since the tubing loop for any given installation needs to be continuous and unbroken from beginning to end, it is necessary that the tubing be looped back into an adjacent groove at the end of each straight line run. To facilitate the looping back of the tubing 6 at the end of each run, the underlayment manufacturers also sell panels that include U-shaped return grooves to receive tubing bends for use at the end of each straight line run. These panels 8, sometimes called "filler strips" or "return panels", permit the installers to turn the tubing 6 180-degrees back through a semi-circular arc and into an adjacent groove 4 so that the tubing 6 can run back and forth across the floor.

While these underlayment panel systems have significantly shortened installation time as compared to the older staple-up or embedded concrete installation methods, they have also created several new design and installation problems of their own. The first issue is that the design of the system and the layout of the panels and returns requires a detailed piping plan that is well thought out in advance. This is particularly important because the installer must leave proper room for the return panels at each end of the room and must know the location of these return panels in advance. Further, while the underlayment panels are rectangular in shape, making them easy to layout and install in a square or rectangular room, when the panels are installed into an odd-shaped room that has walls arranged at other than 90-degree angles as is depicted in FIG. 2, the design work becomes even more critical. In these installations, the return panels 8 must be cut and staggered across the non-square wall. Then additional filler panel material 10 must be installed into the voids around the staggered return panel 8 sections. Finally, it is important that the installer carefully align the groove in the return panels with the grooves in the adjacent underlayment panels because if they are not aligned as seen at 12 in FIG. 1, tubing installation becomes very difficult.

Accordingly, there is a perceived need in the radiant floor heating industry for an improved system for the installation of return panels. Further, there is a perceived need for a method or technique of creating the return bends in place such that non-rectangular room geometries can be accommodated. Still further, there is a perceived need for a method or technique of creating the return bends in place such that the grooves in the return bends are perfectly aligned with the grooves in the underlayment panels.

BRIEF SUMMARY OF THE INVENTION

In this regard, the present invention provides for a novel guide system for cutting return bends directly into the underlayment panels of a radiant floor heating system, thereby eliminating the need for the installation of separate return panels. The guide system of the present invention generally includes a guide panel having a longitudinal guide rail on its bottom surface that is configured to be received into a groove in the underlayment panels. Further, a pivoting guide is installed onto the top surface of the guide panel. The pivoting guide is pivotally movable through a 180-degree arc relative to the guide panel and is generally configured for use with a rotary cutting device such as a router with a plunge or dovetail bit installed therein. While for the remainder of this application the term router will be employed, it should be appreciated that in the context of the present invention any rotary cutter device may be interchangeably employed to achieve the same result and therefore is intended to fall within the scope of this invention. In this regard, a commercially available rotary cutter, such as plunge router, is affixed to the pivoting guide such that the router is pivotably movable through a controlled 180-degree semi-circular arc from a point that is aligned with the groove in which the guide rail is installed to a groove in an adjacent underlayment panel. Since the router is positioned on top of the pivoting guide, which is in turn positioned on top of the guide panel, there is an arcuate groove provided in the guide panel to allow the cutter bit in the router to pass through the guide panel in order to engage and cut the underlayment panel therebeneath. As can be appreciated, the arcuate groove extends at one end from the groove in which the guide rail is installed to an immediately adjacent groove. In addition, a handle assembly is provided to allow the operator to stand up while operating the guide and the router.

In use, the guide system of the present invention is positioned over the two adjacent grooves that are to be connected at the location of the desired return bend. The guide rail on the under side of the guide panel is seated into the first groove so that the bottom surface of the guide panel sits flush against the underlayment panel. Once placed into this position, the arcuate groove in the guide panel extends through a 180-degree semi-circular arc between the adjacent grooves. The router is plunged downwardly into the first groove and is then pivoted through the arc to cut a custom return bend between the two adjacent grooves. This process is then repeated at all of the desired locations.

Using the guide system of the present invention, the radiant panel underlayment can be routinely installed over the entire surface area of the room to be heated by non-experienced contractors without the need to refer to any detailed piping layouts. Thereafter, the piping installer can layout custom piping routes and simply cut return bends from one groove to the next at any desired location rather than having to be confined to pre-arranged pipe routes.

Accordingly, it is an object of the present invention to provide a novel router guide system that permits the user to create custom return bends at any desired location on a grooved radiant underlayment panel. It is a further object of the present invention to provide a method or technique of creating the return bends in place such that non-rectangular room geometries can be accommodated. It is still a further object of the present invention to provide method or technique of creating the return bends in place such that the grooves in the return bends are perfectly aligned with the grooves in the underlayment panels.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
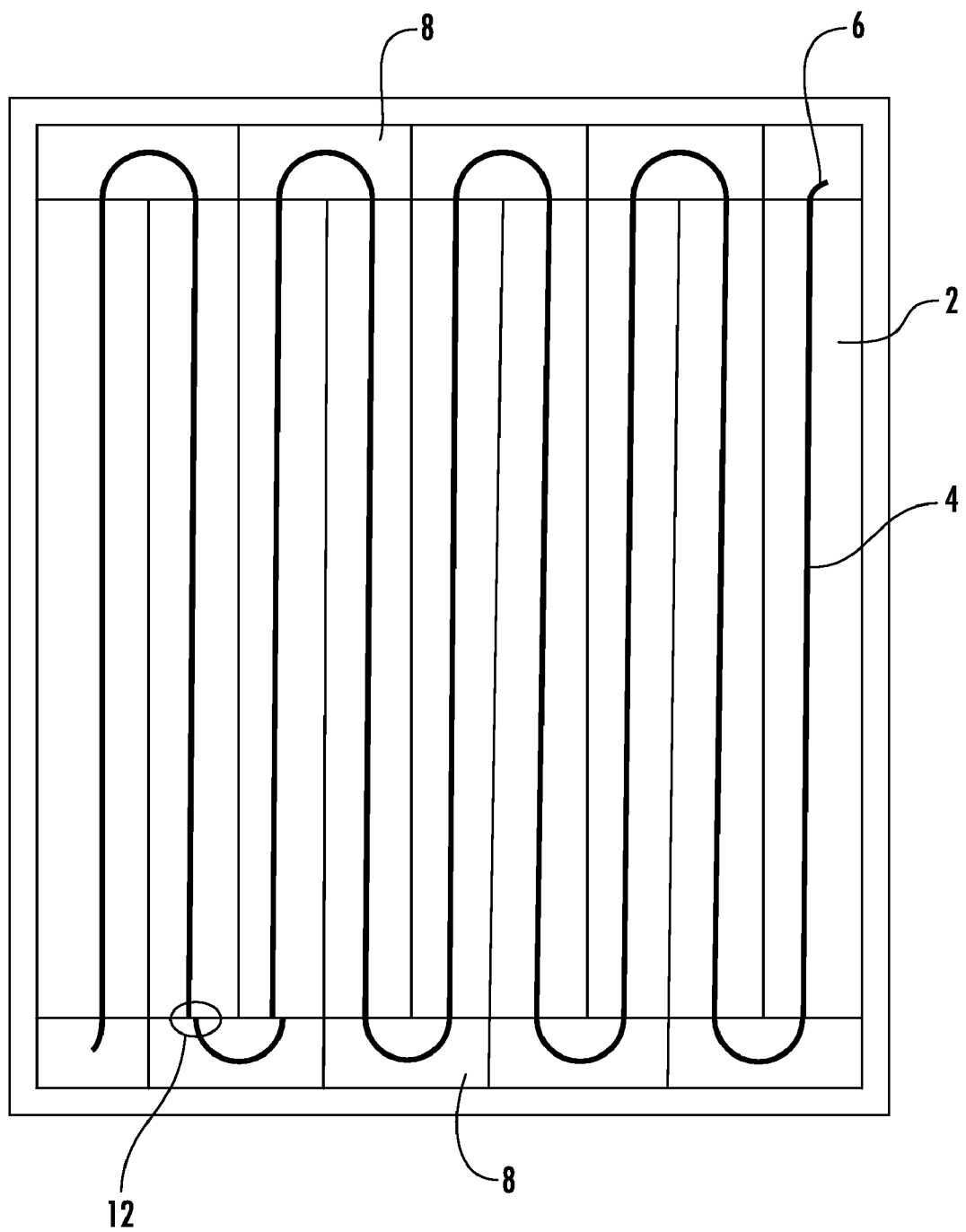
FIG. 1 is an illustration of the prior art system of installing underlayment radiant flooring panels into a rectangular room including separate grooved panels and return panels.
Figure 2:
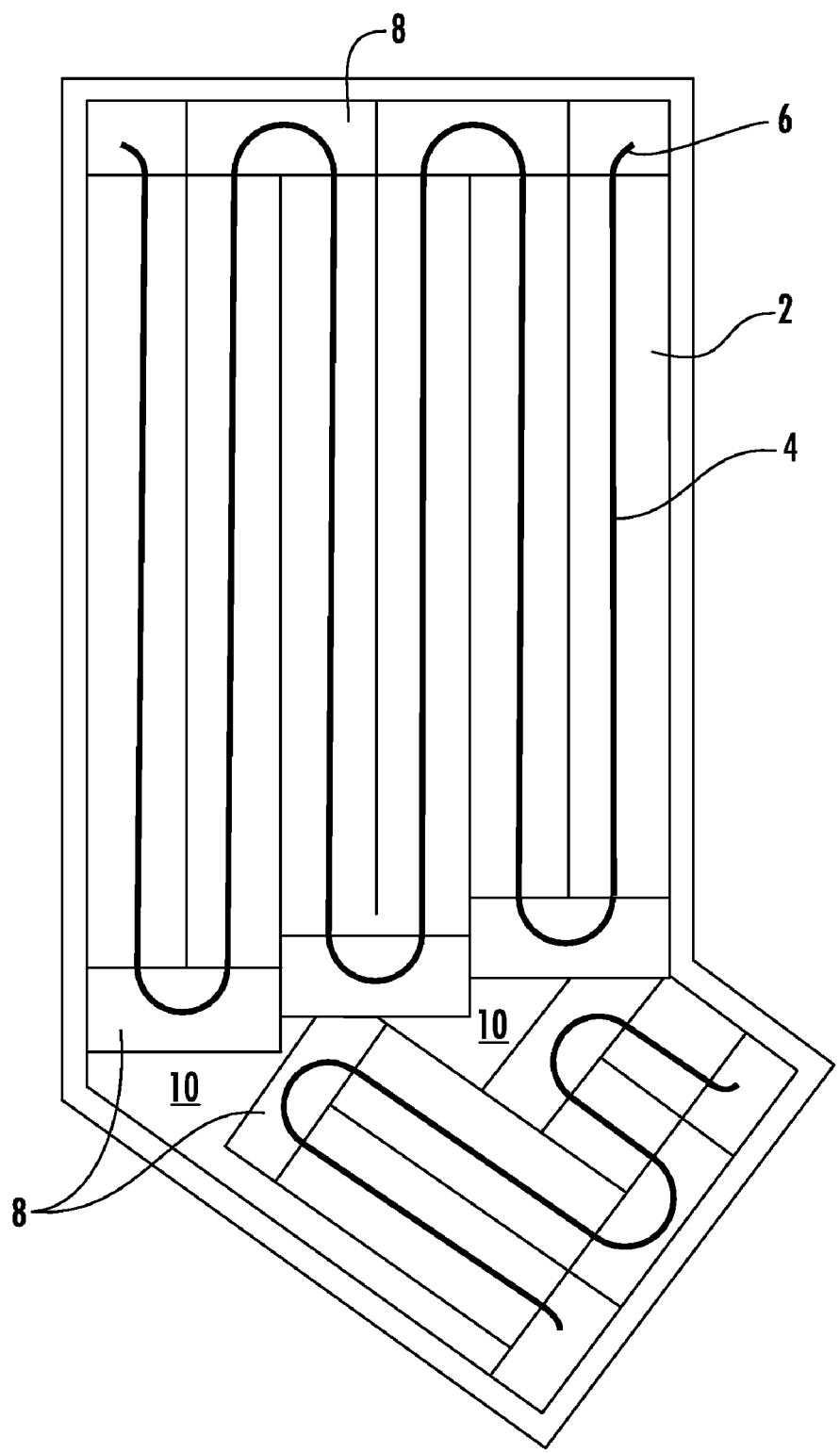
FIG. 2 is an illustration of the prior art system of installing underlayment radiant flooring panels into an irregularly shaped room including separate grooved panels and return panels.
Figure 3:
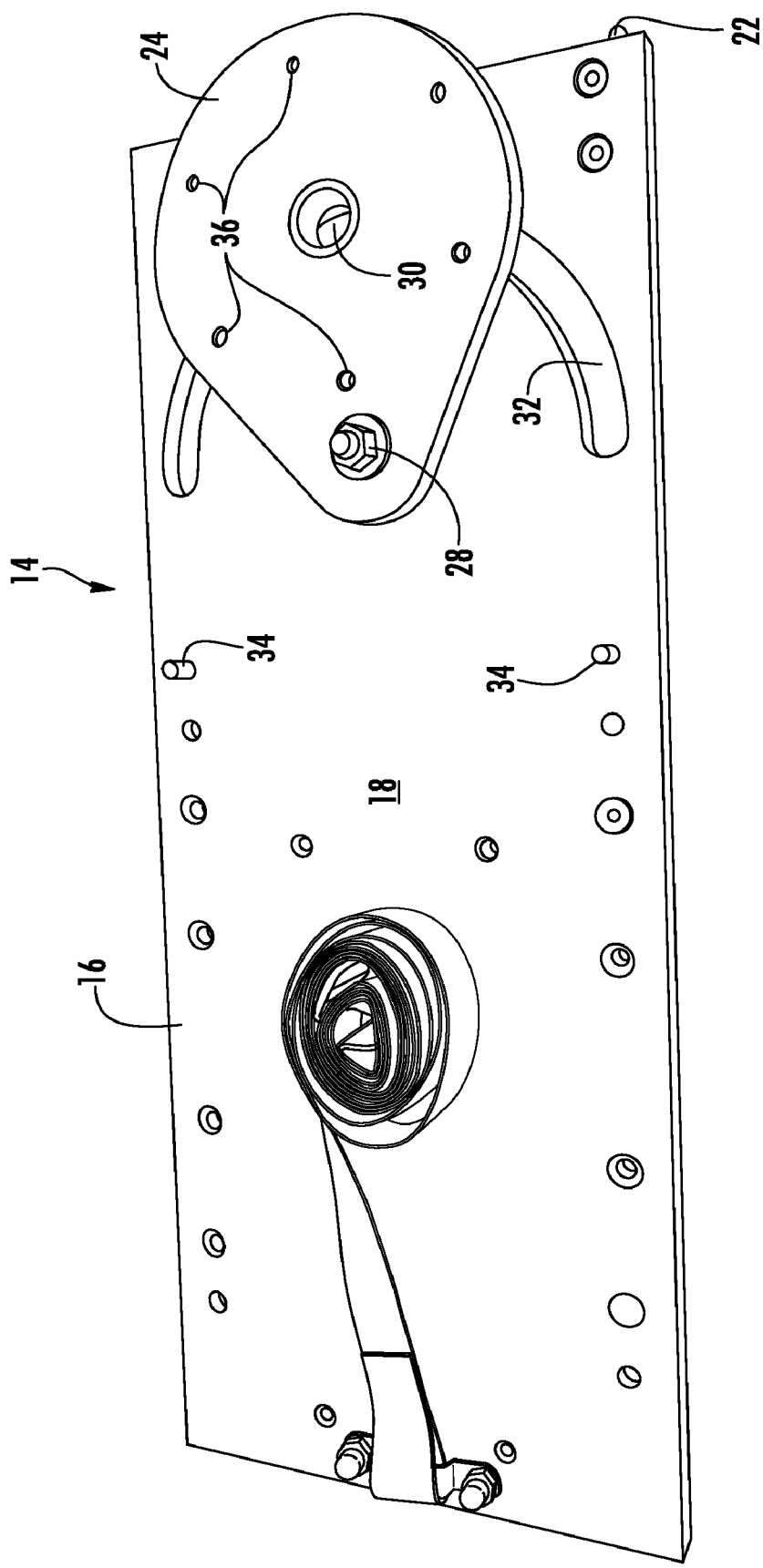
FIG. 3 is a top view of guide system of the present invention.
Figure 4:
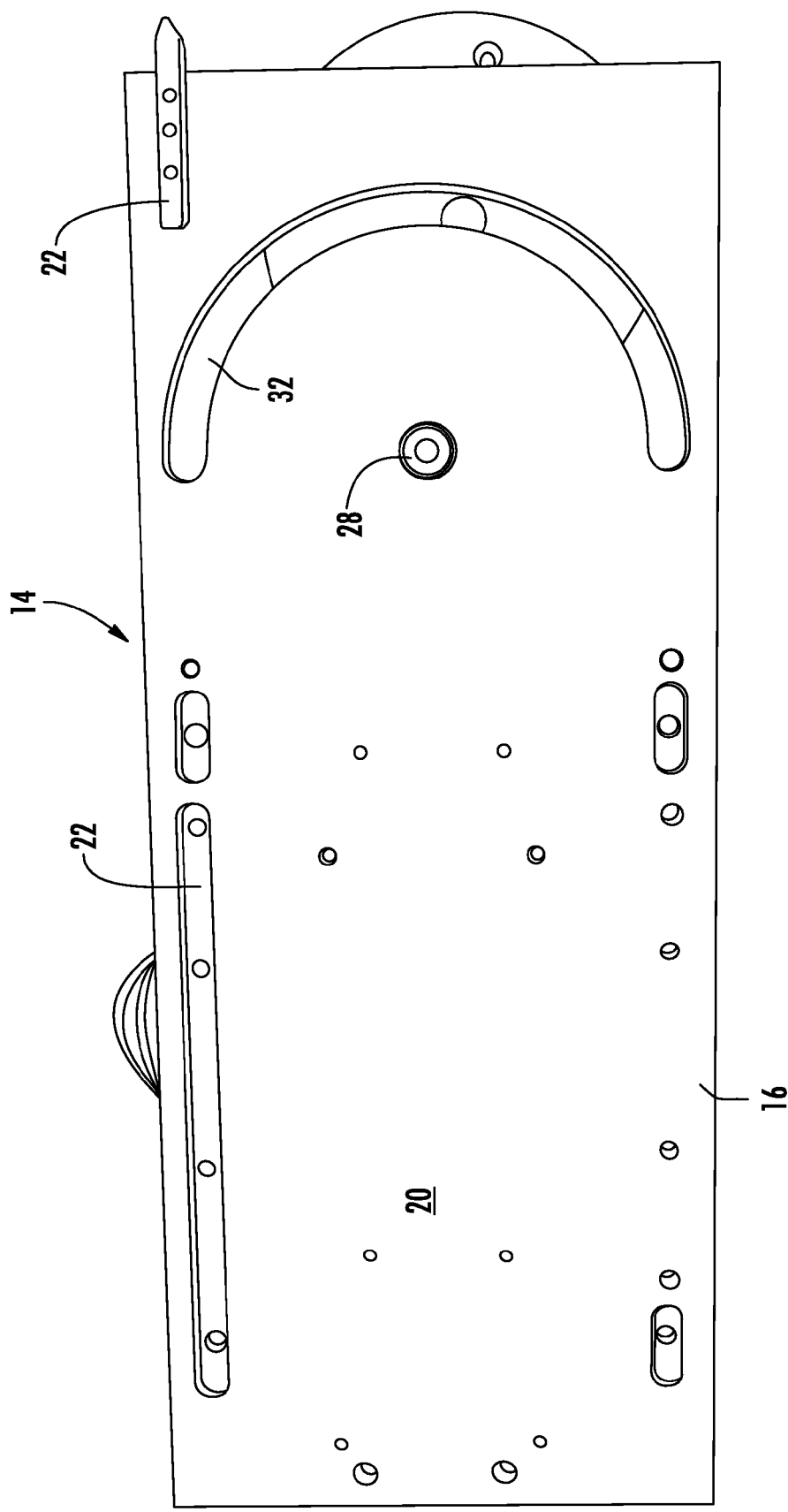
FIG. 4 is a bottom view of the guide system of the present invention.
Figure 5:
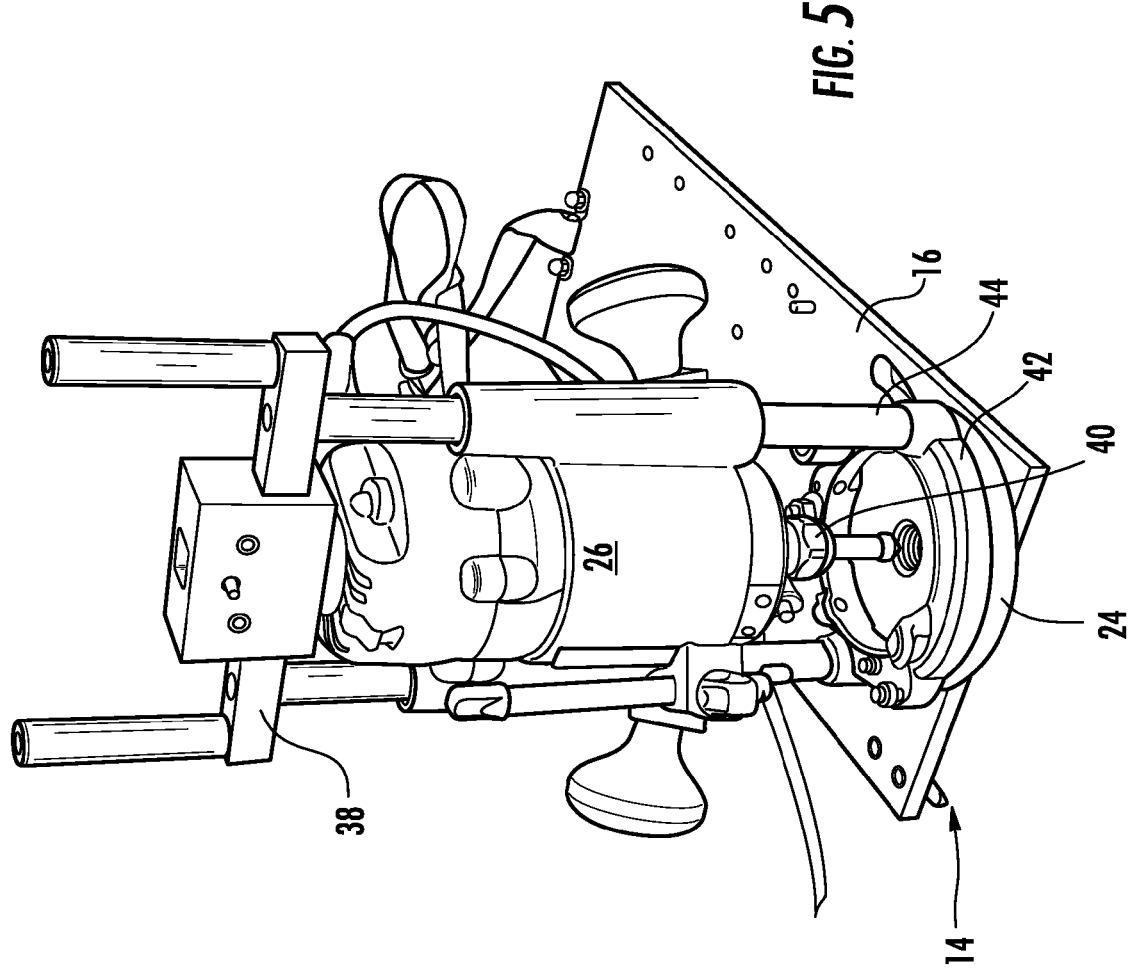
FIG. 5 is a top perspective view of the guide system of the present invention with a rotary cutter affixed thereto.

Now referring to the drawings, the novel guide system of the present invention is shown and generally illustrated in FIGS. 3-5. As was stated above, the guide system 14 of the present invention facilitates the cutting of return bends directly into the underlayment panels of a radiant floor heating system, thereby eliminating the need for the installation of separate return panels. As will be discussed in greater detail below, the guide system 14 of the present invention generally includes a guide panel 16 having a top surface 18 (see FIG. 3) and a bottom surface 20 (see FIG. 4). A longitudinal guide rail 22 is affixed to the bottom surface 20 of the guide panel 16 and serves to align the guide system 14 with the underlayment panels as will be better described below. A pivoting guide 24 can be seen pivotally affixed to the top surface 18 of said guide panel 16 and as can be seen in FIG. 5, a rotary cutting device 26 affixed to the pivoting guide 24. In this manner, the pivoting guide 24 supports and guides the rotary cutting device 26 through a 180-degree arc.

Turning back to FIGS. 3 and 4, the pivoting guide 24 can be seen to be pivotally affixed to the guide panel 16 by a pivot shaft 28, which in this case is a bolt extending upwardly from the guide panel 16 with a nut on the end thereof. It should be appreciated that the pivoting shaft 28 could also be any suitable fastener that will retain the guide panel 16 and pivoting guide 24 in assembled relation yet still allow the pivoting guide 24 to pivot relative to the guide panel 16. The pivoting guide 24 can also be seen to include an aperture 30 therein and the guide panel 16 can be seen to include a semicircular slot 32 formed therethrough. The aperture 30 and semicircular slot 32 are aligned such that the cutting bit in the rotary cutter 26 can extend through both the pivoting guide 24 and the guide panel 16 to engage the underlayment panels that are positioned therebeneath, thereby allowing the bit to cut the required return bend. In addition, as can best be seen in FIG. 3, stops 34 are provided to prevent the pivoting guide 24 and the rotary cutter 26 from traveling beyond a full 180-degree semicircular arc. While these stops 34 are shown as pins, any means for stopping the pivoting guide 24 and prevention over rotation thereof may be employed.

Turning now to FIG. 5, a rotary cutter device 26 is installed onto the pivoting guide 24. The rotary cutter 26 may be affixed to the pivoting guide 24 by any means known in the art. Preferably, the plastic base plate typically installed onto the base of the rotary cutter 26 is removed exposing several threaded apertures that are provided therein (the plastic base plate and threaded apertures are not shown as they are features that are well known in the art). The pivoting guide 24 (as can be seen in FIG. 3) includes screw holes 36 therein that correspond to the standard threaded aperture pattern provided in the base of the rotary cutter 26. Screws can then be installed through the pivoting guide 24 and into the threaded apertures in the base of the rotary cutter 26 thereby retaining the rotary cutter 26 in assembled relation with the pivoting guide 24. It can also be seen that a handle 38 is installed onto the rotary cutter 26. The handle 38 is an attachment device that is installed onto the rotary cutter 26 and allows a user to control the rotary cutter 26 while it is installed in the guide assembly 14 of the present invention and while the user is standing thereby eliminating the need for the user to perform this operation on his knees.

It should be appreciated that there are a wide variety of different rotary cutters 26 commercially available today. In principle, a rotary cutter 26 is simply a motor having a chuck installed on the end of its drive shaft. A bit 40 that is configured to spin and cut using its side edges is installed into the chuck such that rotation of the motor causes rotation of the bit 40 wherein cutting edges on the side of the bit 40 cut into the material against which the bit 40 is placed. One example of such a rotary cutter 26 is a router such as is depicted at FIG. 5. While for the remainder of this application the term router will be employed, it should be appreciated that in the context of the present invention any rotary cutter 26 device may be interchangeably employed to achieve the same result and therefore is intended to fall within the scope of this invention.

Preferably, the router 26 is a commercially available plunge router wherein the motor of the router 26 is received into a base 42 that slidably supports the motor on two guide rails 44. In this manner, the router 26 is slidably displaceable between a raised, disengaged position, wherein the cutter bit 40 is above the plane of the router base 42 thereby preventing it from cutting any material and a lowered engaged position wherein the cutter bit 40 is plunged into the surface to be cut. In operation, this allows the user to turn the router 26 on, position the guide assembly 14 and plunge the router 26 into the engaged position in order to cut the return bend. When the entire 180-degree semi-circular return bend is cut, the router 26 can be raised to disengage the bit 40 from the underlayment. The cutter bit 40 may be a straight edged cutter bit that will cut a groove that has vertical sidewalls. In the alternative, the bit 40 may have a tapered cutting edge to form a groove that has a slight undercut that corresponds to the undercut provided in the grooves in the standard underlayment panels. It has been found that such an undercut facilitates firm retention of the tubing installed therein.

Figure 6:
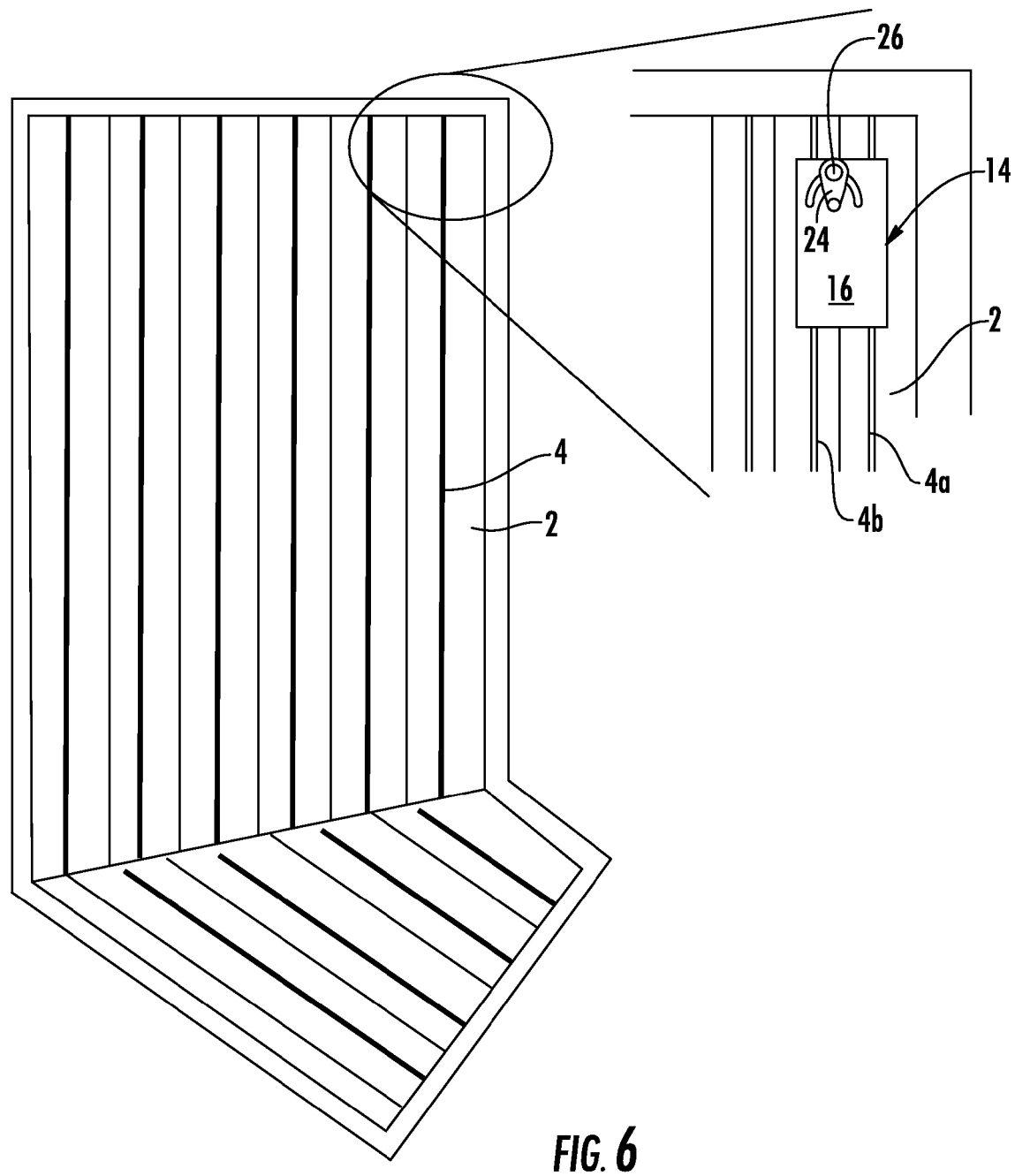
FIG. 6 is an illustration of installation of underlayment radiant flooring panels into a room using the system of the present invention to create return bends.

Turning now to FIG. 6, as was described above, underlayment panels 2 used in radiant heat systems are made of ½ inch or ¾ inch CDX plywood and are attached to an aluminum backing that acts as a heat spreader to more evenly distribute the heat throughout the finished floor. The panels 2 come in various sizes, such as for example 7×48 inches and 10×48 inches. Regardless of size, each panel 2 has a groove 4 down the center of the plywood panel 2 to accept a single run of tubing, so when the panels 2 are installed side-by-side onto the floor, the tubing runs end up being spaced apart at either 7 inches or 10 inches on-center, depending on the width of the panel 2. In this regard is should be appreciated that depending on the spacing of the grooves 4, different sizes of guide systems 14 will be required. Alternately, the guide system 14 may be manufactured in such a manner as to allow the guide system 14 to be set up for any of the required standard spacings.

In contrast to the prior art, the guide system 14 of the present invention eliminates the need to install return panels at the ends of the underlayment panels 2 since the guide system 14 of the present invention allows the necessary return bends to be cut in place. Accordingly, the underlayment panels 2 are installed into the room from wall to wall as can be seen in FIG. 6. As can be seen in the inset of FIG. 6, the guide panel system 14 is then positioned over the two adjacent grooves 4a and 4b that are to be connected at the location of the desired return bend. The longitudinal guide rail 18 is seated into the first groove 4a so that the guide panel system 14 sits flush against the underlayment panel 2. The router 26 is then activated and is plunged downwardly into the first groove 4a. The router 26 and pivot guide 24 are then pivoted through the entire 180-degree arc from the first groove 4a through the material of the underlayment panel 2 lying between the first 4a and second 4b grooves and into the second groove 4b. As the router bit 40 travels across the arc, it cuts the underlayment panel 2 to create a custom return bend that extends from the first groove 4a to the second groove 4b. The process is repeated at all of the desired locations.

Figure 7:
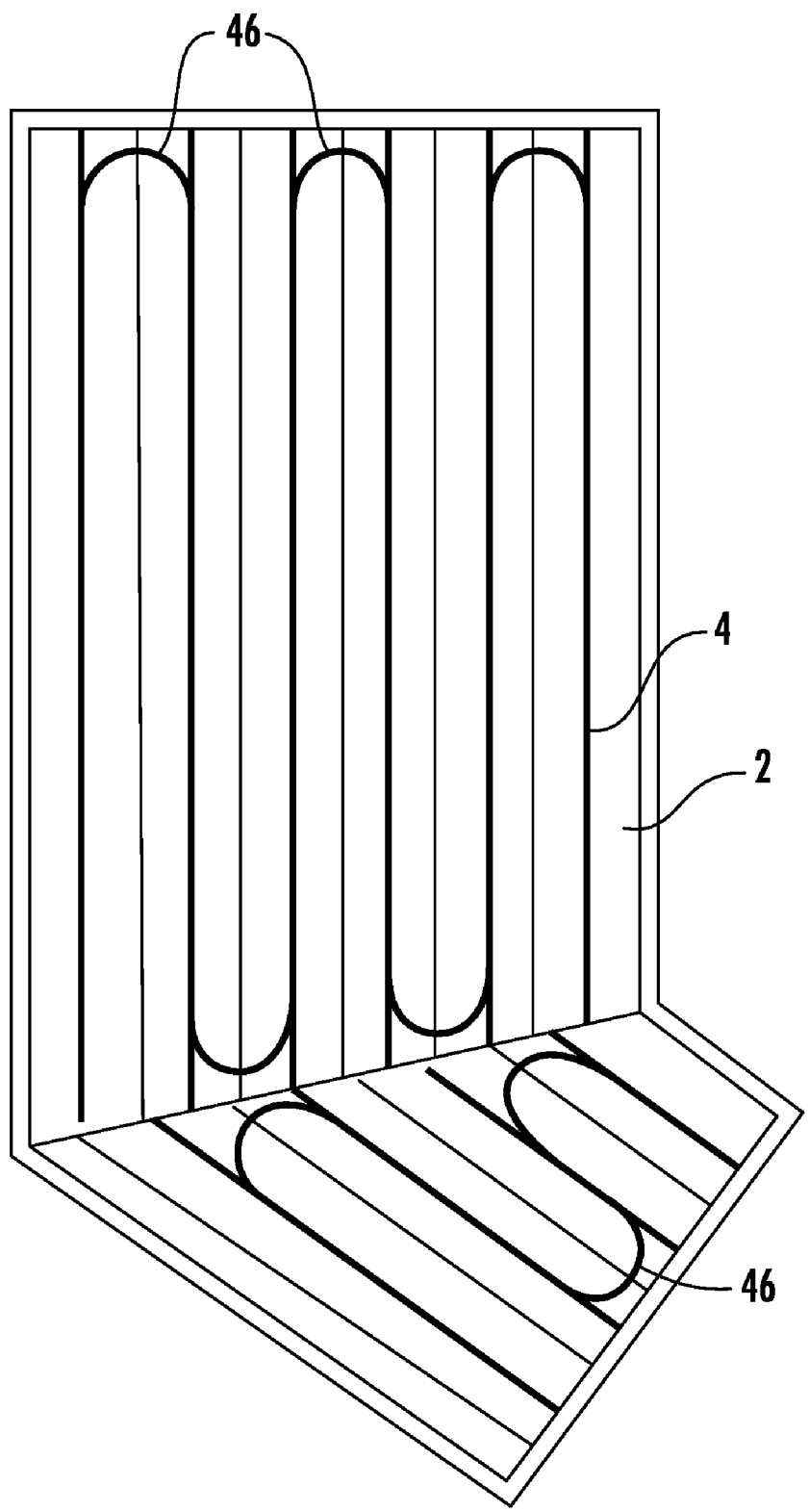
FIG. 7 is an illustration of a completed installation of underlayment radiant flooring panels into a room using the system of the present invention.

Using the guide system 14 of the present invention as depicted at FIG. 7, the underlayment panels 2 can be routinely installed over the entire surface area of the room to be heated by non-experienced contractors without the need to refer to any detailed piping layouts. Thereafter, the piping installer can layout custom piping routes and simply cut return bends 46 from one groove 4 to the next at desired locations rather than having to be confined to pre-arranged pipe routes.

It can therefore be seen that the instant invention provides a novel router guide system 14 that permits the user to create custom return bends 46 at any desired location on a grooved radiant underlayment panel 2. It can further be seen that the present invention allows the underlayment panels to be installed uniformly throughout a room without regard to the piping layout since any of the necessary return bends 46 can be neatly and uniformly cut at a later time facilitating a great reduction of labor required in the installation of such radiant heating systems. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A rotary cutter guide system for cutting an underlayment panel including at least two parallel grooves therein comprising:
    a guide panel having a top surface, a bottom surface, an opening in said guide panel and a longitudinal guide rail on said bottom surface for engagement with one of said grooves;
    a pivoting guide pivotally affixed to said top surface of said guide panel; and
    a rotary cutting device having a cutting bit installed therein affixed to said pivoting guide, the pivoting guide supporting and guiding the rotary cutting device, such that said cutting bit passes through said opening in said guide panel to cut a 180-degree arc in said underlayment panel.

2. The rotary cutter guide system of claim 1, wherein said rotary cutter guide system is placed over said underlayment panel, said guide rail being received into a first of said grooves said pivoting guide supporting and guiding said rotary cutting device through a 180-degree arc wherein said rotary cutting device cuts a return loop in said underlayment panel between said first and second grooves.

3. The rotary cutter guide system of claim 2, wherein said underlayment panel is underlayment panels for a radiant panel heating system.

4. The rotary cutter guide system of claim 1, wherein said rotary cutter is a router with a plunge bit installed therein.

5. The rotary cutter guide system of claim 4, wherein said plunge bit is a straight bit.

6. The rotary cutter guide system of claim 4, wherein said plunge bit is a tapered bit.

7. The rotary cutter guide system of claim 4, wherein said router is a plunge router that is movable between a raised idle position and a lowered cutting position.

8. The rotary cutter guide system of claim 1, further comprising:
- a handle assembly extending from said rotary cutting device to allow a user to operate said rotary cutting device while standing.

9. A router guide system for cutting an underlayment panel for a radiant heating system, the underlayment panel including at least two parallel grooves therein said router guide system comprising:
- a guide panel having a top surface, a bottom surface, a longitudinal guide rail on said bottom surface and an arcuate groove extending through said guide panel;
- a pivoting guide pivotally affixed to said top surface of said guide panel; and
- a router affixed to said pivoting guide, said router including a cutting bit installed therein, said cutting bit extending through said arcuate groove in said guide panel, wherein said router guide is placed over said underlayment panel, said guide rail being received into a first of said grooves said pivoting guide supporting and guiding said rotary cutting device through a 180-degree arc wherein said rotary cutting device cuts a return loop between said first and second grooves.

10. The router guide system of claim 9, wherein said cutting bit is a plunge bit.

11. The router guide system of claim 10, wherein said plunge bit is a straight bit.

12. The router guide system of claim 10, wherein said plunge bit is a tapered bit.

13. The router guide system of claim 9, wherein said router is a plunge router that is movable between a raised idle position and a lowered cutting position.

14. The router guide system of claim 9, further comprising:
- a handle assembly extending from said rotary cutting device to allow a user to operate said rotary cutting device while standing.

* * * * *